UNITED STATES PATENT OFFICE.

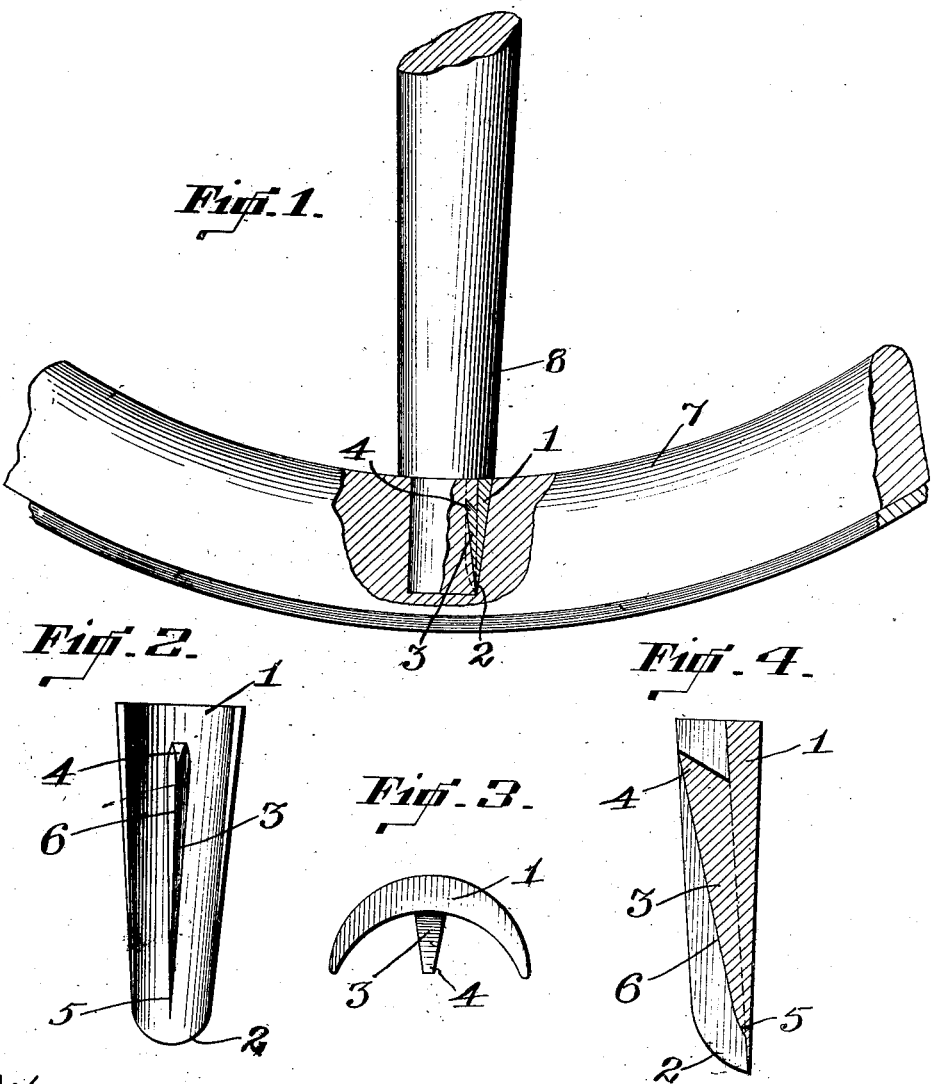

WILLIAM LAPSLEY JETT, OF FRANKFORT, KENTUCKY.

SPOKE-FASTENER.

938,149.

Specification of Letters Patent.   Patented Oct. 26, 1909.

Application filed February 11, 1909. Serial No. 477,479. (Model.)

*To all whom it may concern:*

Be it known that I, WILLIAM LAPSLEY JETT, a citizen of the United States, residing at Frankfort, in the county of Franklin, State of Kentucky, have invented certain new and useful Improvements in Spoke-Fasteners, of which the following is a specification.

The object of this invention is to provide a simple and efficient device for tightening spokes when they have become loose in the wheel felly after use, and consists in the novel construction hereinafter described and more particularly pointed out in the accompanying claim.

In order to more fully describe said invention reference will be had to the accompanying drawings wherein—

Figure 1 represents in vertical central section a form of my said fastener, showing the same in position on a wheel; Fig. 2 an elevation of the concave face of said fastener removed from the wheel and shown upon a somewhat larger scale than in Fig. 1; Fig. 3 a top plan view of said fastener upon a still larger scale, and Fig. 4 a vertical central section of the fastener removed from the wheel and shown upon the same scale as in Fig. 2.

In the form of my invention shown it consists of a concavo-convex wedge 1, tapering from a flat top to a rounded sharp edge 2 at its bottom, and having formed on its concave face a flange 3, which is pointed at its upper end to form a barb 4, and then tapered to a point 5 where it terminates near the sharpened lower end of the wedge. This flange 3 is preferably triangular or wedge-shaped in cross-section, the base of the triangle forming the juncture of the flange with the main body of the wedge 1 and the apex a point in a sharpened edge 6 tapering to point 5.

In Fig. 1 I have shown a portion of a wheel felly 7, and a spoke 8, retained in its socket by my improved fastener.

To tighten a loose spoke with my improved fastener, said fastener is placed with its barbed flange next to the spoke and preferably in the plane in which all the spokes lie, that is, near the center of the felly instead of near its side, so as to prevent splitting the felly, and then the fastener is driven down until its top passes under the shoulder of the spoke, as shown in Fig. 1. When thus placed, the fastener by virtue of its wedge shape will force the spoke tightly against its socket, and in addition to this, the flange 3 will bite into the spoke to such an extent as to materially expand said spoke in its socket thereby further tightening the same. The barb 4 prevents the fastener from working up out of place.

The flange 3 is preferably integral with the main body of the fastener, the whole being preferably made of one piece of metal.

Having thus described a form of my said invention, and, without confining myself to the specific form shown herein further than expressly stated in the claim, what I claim is:

A spoke fastener, comprising a concavo-convex wedge having formed on its concave face an elongated flange extending longitudinally of said wedge and pointed at its top to form a barb, the said flange being substantially wedge-shaped in cross-section and tapering to a point at its lower end, substantially as described.

WILLIAM LAPSLEY JETT.

Witnesses:
L. C. WALLACE,
T. H. CROCKETT.